(No Model.)
J. F. SINKLER.
VEHICLE BRAKE.
No. 490,368. Patented Jan. 24, 1893.
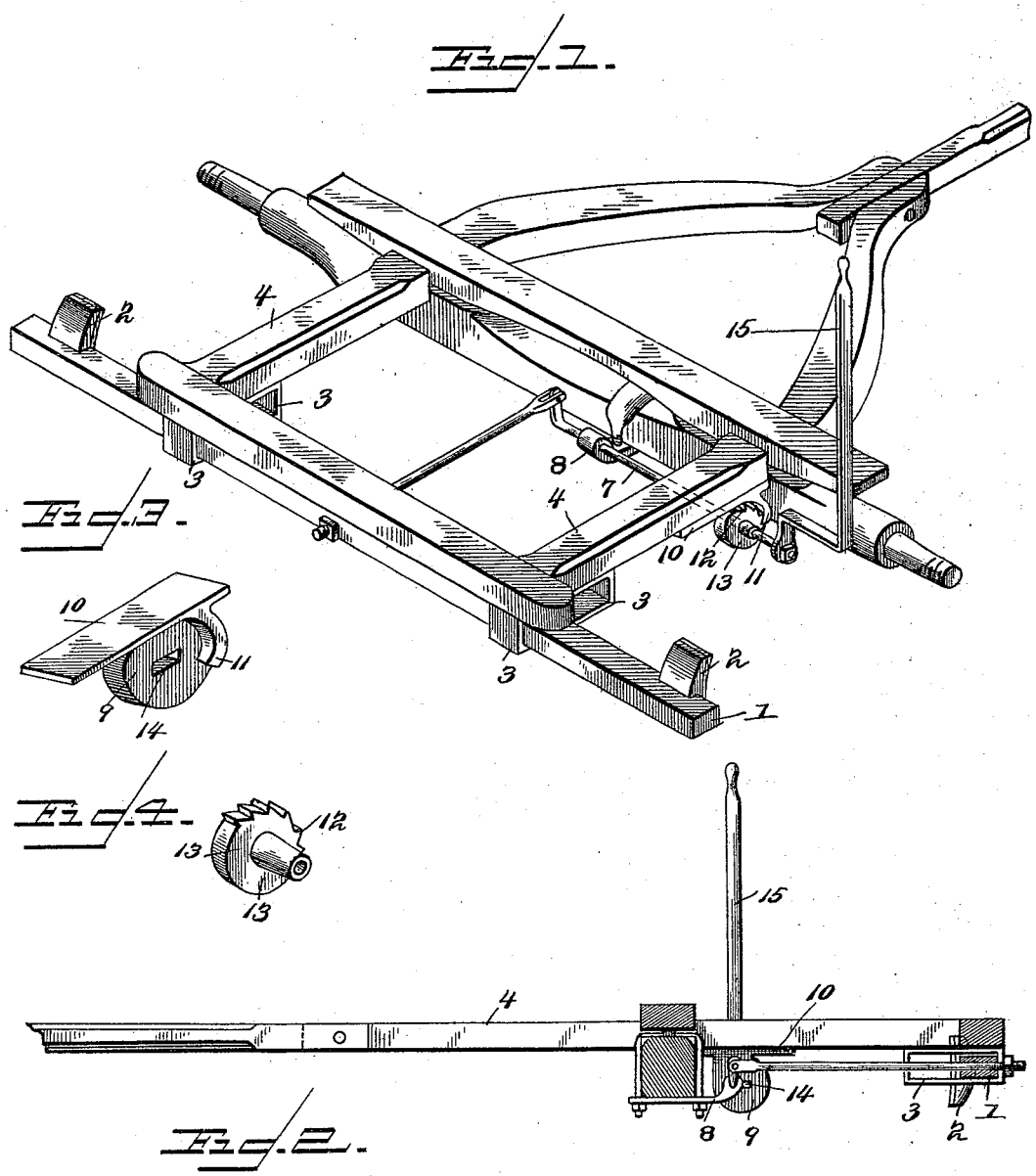
Witnesses
E. K. Stewart
N. J. Riley
Inventor
J. F. Sinkler,
By his Attorneys,
C. A. Snow & Co.

UNITED STATES PATENT OFFICE.

JAMES FRANCIS SINKLER, OF TROY, TENNESSEE.

VEHICLE-BRAKE.

SPECIFICATION forming part of Letters Patent No. 490,368, dated January 24, 1893.

Application filed October 28, 1892. Serial No. 450,281. (No model.)

*To all whom it may concern:*

Be it known that I, JAMES FRANCIS SINKLER, a citizen of the United States, residing at Troy, in the county of Obion and State of Tennessee, have invented a new and useful Vehicle-Brake, of which the following is a specification.

The invention relates to improvements in vehicle brakes.

The object of the present invention is to provide a brake which will be simple, strong and durable, and adapted to be readily applied and released.

The invention consists in the construction and novel combination and arrangement of parts hereinafter fully described, illustrated in the accompanying drawings and pointed out in the claims hereto appended.

In the drawings—Figure 1 is a perspective view of a portion of a running gear provided with a brake constructed in accordance with this invention. Fig. 2 is a longitudinal sectional view. Fig. 3 is a detail perspective view of a bearing hanger. Fig. 4 is a similar view of the ratchet wheel.

Like numerals of reference indicate corresponding parts in all the figures of the drawings.

1 designates a brake-bar carrying brake-shoe 2 at its ends and suspended in guide stirrups 3 which are arranged on the lower faces and at the rear ends of front hounds 4 of a running gear. The brake-bar is centrally connected by a rod 5 with an arm 6 of a rock-shaft 7 which is arranged transversely of the running gear and extends from the middle thereof to one side, and is journaled in a bearing bracket 8 and a hanger 9. The bearing bracket is clipped to the front axle and extends rearward therefrom, and is arranged near the middle thereof, and at its rear end is provided with a bearing opening receiving said shaft. The hanger 9 is secured to one of the hounds, and consists of a body portion and a securing plate 10 formed integral with the body portion and arranged at the top thereof, and a curved exterior lug 11 having its lower end shaped to form a tooth and adapted to engage ratchet teeth 12 of a mutilated ratchet wheel 13. The body portion of the hanger is of the thickness of about one half the width of the securing plate 10, and the curved lug on the outside of the hanger forms a recess or partial housing for the ratchet wheel which is secured to the rock-shaft by a set screw, and which has a laterally extended hub on which the set screw is mounted. The rock-shaft is arranged in a horizontally elongated opening 14 which is preferably rectangular and on the outer end of the rock-shaft which is squared, threaded and provided with a nut, is secured a lever 15 which is provided at its lower end with a rectangular opening to receive the squared portion of the rock-shaft. When the lever is moved forward to partially rotate the rock-shaft, the movement also carries the rock-shaft to the forward end of the elongated opening of the hanger to bring the ratchet wheel in position to be engaged by the stationary integral tooth of the hanger. A reverse or backward movement of the lever moves the rock-shaft backward, disengaging the ratchet wheel from the tooth of the hanger and permitting the rock-shaft to turn to throw the brake-shoes off the wheels. The operating lever is provided near its lower end with an outward bend to clear a vehicle body and by being adjustably secured to the rock-shaft its position may be changed from a vertical to a horizontal position to enable it to be employed when the vehicle is used for hauling hay or the like where the lever could not be used in a vertical position.

It will be seen that the brake mechanism is simple, inexpensive, strong and durable; that it is adapted to be readily applied to a vehicle to brake on the front wheels, and that the brake is quickly operated to carry the brake shoes in engagement with the wheels or to relieve the latter from the brake shoes.

What I claim is—

1. The combination with a running gear, of a brake-bar arranged on the front hounds and carrying brake-shoes, a rock shaft arranged transversely of the running gear and provided at its inner end with an arm connected with the brake-bar, a hanger having a horizontal opening and provided with a tooth, a ratchet wheel mounted on the rock-shaft and adapted to be engaged by the tooth when the rock shaft is at the forward end of the opening, and the lever secured to the outer end of the rock-shaft, substantially as described.

2. The combination with a running gear, of a brake-bar carrying brake-shoes, a rock-shaft provided at its inner end with an arm connected with the brake-bar, a hanger having an elongated opening and provided at the forward end thereof with a stationary tooth, a ratchet wheel mounted on the rock-shaft and adapted to engage the tooth of the hanger when the rock-shaft is at the forward end of the opening, and the lever secured to the outer end of the rock-shaft and adapted to turn the rock-shaft and move the same forward and backward in the elongated opening to carry the ratchet wheel in and out of contact and engagement with the stationary tooth, substantially as described.

3. The combination with a running-gear, of a brake-bar arranged on the front hounds thereof and carrying brake-shoes, a bracket plate clipped to the front axle and extending rearward therefrom and having a bearing, a hanger having a securing plate fastened to one of the front hounds and provided with a horizontal elongated opening and having on its outer face a curved lug, the lower end of which forms a tooth, a rock-shaft arranged in the elongated opening and in the bearing of the bracket plate and provided at its inner end with an arm, a rod connecting the arm of the rock-shaft with the brake-bar, a mutilated ratchet wheel provided at one side with ratchet teeth and mounted on the rock-shaft and arranged at the outer side of the hanger and adapted to engage the tooth thereof, and a lever secured to the outer end of the rock-shaft, substantially as described.

In testimony that I claim the foregoing as my own I have hereto affixed my signature in the presence of two witnesses.

JAMES FRANCIS SINKLER.

Witnesses.:
 J. P. MURPHY,
 S. D. CEILWER.